United States Patent
Chavez et al.

(10) Patent No.: US 11,627,288 B2
(45) Date of Patent: Apr. 11, 2023

(54) SYSTEMS AND METHODS OF AUTOMATIC SURVEILLANCE AND REPORTING

(71) Applicant: Avaya Management L.P., Durham, NC (US)

(72) Inventors: David Chavez, Broomfield, CO (US); Valentine C. Matula, Granville, OH (US); Dragan Grebovich, Amesbury, MA (US); Amit Mishra, Broomfield, CO (US); John Carey, Villa Hills, KY (US)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/218,763

(22) Filed: Mar. 31, 2021

(65) Prior Publication Data

US 2022/0321842 A1  Oct. 6, 2022

(51) Int. Cl.
*H04N 7/18* (2006.01)
*G06N 20/00* (2019.01)
*G10L 25/51* (2013.01)

(52) U.S. Cl.
CPC ............. *H04N 7/185* (2013.01); *G06N 20/00* (2019.01); *G10L 25/51* (2013.01)

(58) Field of Classification Search
CPC ......... H04N 7/185; G06N 20/00; G10L 25/51
USPC ........ 348/144, 143, 148, 149, 152; 386/226, 386/228
See application file for complete search history.

(56) References Cited

U.S. PATENT DOCUMENTS 9,418,350 B2  8/2016  Matula et al.
10,032,137 B2  7/2018  Skiba et al.

FOREIGN PATENT DOCUMENTS

| AU | 2008211786 A1 * | 8/2008 |
| WO | WO 2015/119648 | 8/2015 |
| WO | WO 2017/152067 | 9/2017 |

* cited by examiner

*Primary Examiner* — Robert Chevalier
(74) *Attorney, Agent, or Firm* — Sheridan Ross P.C.

(57) ABSTRACT

Systems and methods for surveilling. Systems and methods include generating, with a processor, a baseline associated with a subject; performing, with the processor, a scan of the subject; comparing, with the processor, the scan of the subject with the baseline; and generating, with the processor, a report comprising a result of the comparing of the scan of the subject with the baseline associated with the subject.

20 Claims, 6 Drawing Sheets

SYSTEMS AND METHODS OF AUTOMATIC SURVEILLANCE AND REPORTING

FIELD

The present disclosure is directed generally toward systems and methods of surveilling and reporting and more particularly toward systems and methods of providing autonomous surveillance in relation to workflows.

BACKGROUND

A primary objective of workflow systems, such as systems operated by contact center staff, is to maximize workflow efficiency. An ongoing challenge in contact center work and other workflow system usage scenarios is managing numerous projects with separate workflows, each competing for the attention of a user. Users of workflow systems must find ways to optimize response time and maximize efficiency. Contemporary solutions for workflow system management lack efficiency and require many educated users working around the clock to keep up to date with the ever increasing number of workflow items.

Conventional systems for managing workflow, such as within contact centers, has reduced the effort required to determine next steps in projects. Users may follow workflows in an efficient manner to complete increasingly complex tasks.

Projects, such as would be completed by contact center workers, often involve gaining information from one or more remote locations or one or more users remotely. The ability to use autonomous device remotely has enabled users to gain information from remote locations without leaving their seat. As the use of computers removes the necessity of users to be physically present to obtain information, Modern technology has made the use of autonomous devices such as robotic vehicles and unmanned aerial vehicles an increasingly feasible option for average users. Users are enabled to communicate with autonomous devices from remote locations using communication networks such as the Internet.

Contemporary methods of managing workflow are inadequate in managing many types of workflow. For example, inspection changes in physical property in remote locations presents many challenges. If changes occur in hard-to-reach places, such as behind walls or fences, monitoring such hard-to-reach places for changes is difficult and time consuming.

There remains a need for a more efficient workflow system enabling users to be more efficient and capable of responding to workflow items requiring human interaction while being free from the distractions of tasks which are capable of being performed solely by a computer device. It is therefore desirable to provide an automated system of workflow management.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
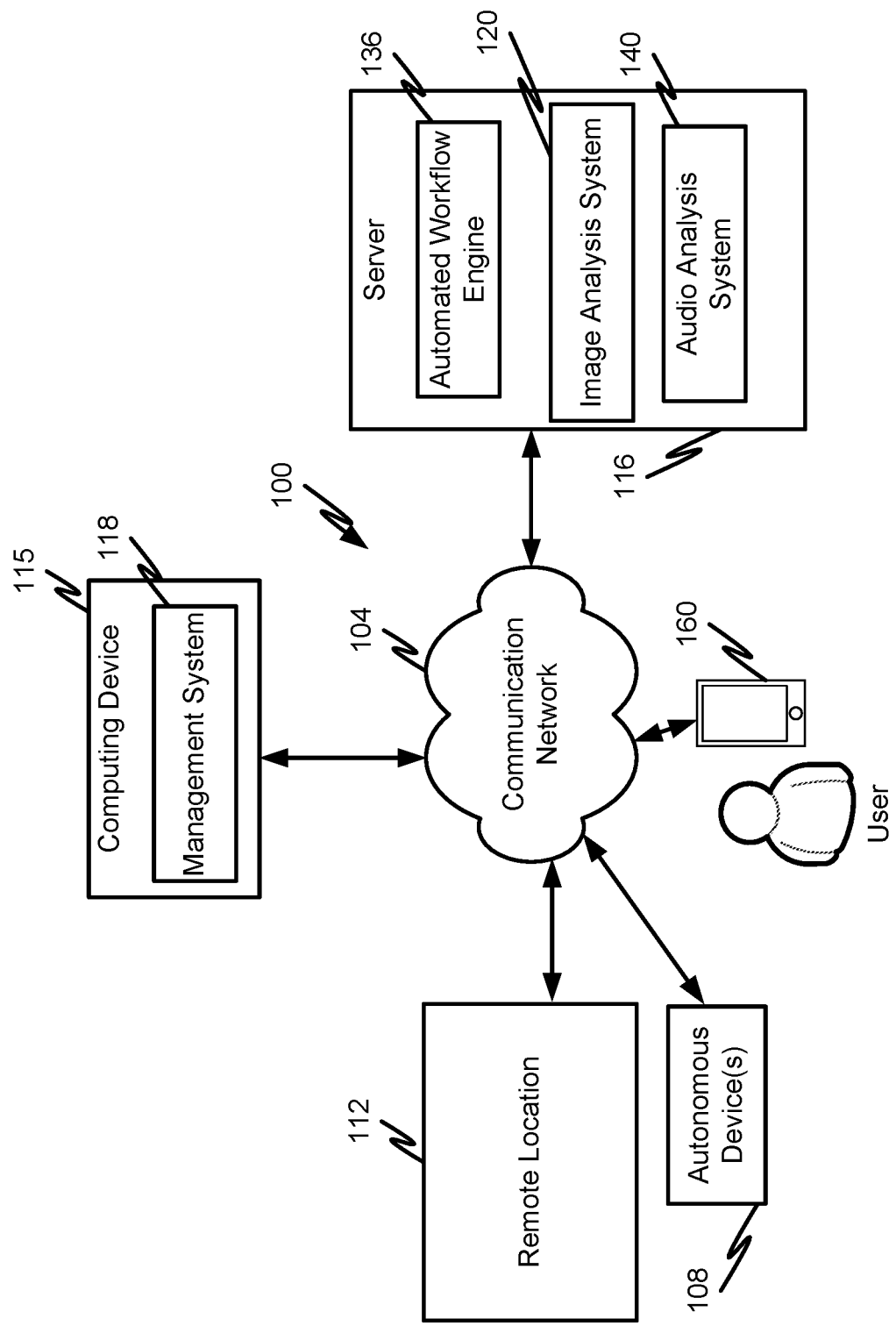
FIG. 1 illustrates a computing environment in accordance with one or more of the embodiments described herein.

What is needed is a comprehensive workflow management system with artificial intelligence capabilities which may be configured to perform or assign automatable tasks, including, for example, instructing an autonomous device such as a drone to travel to remote locations to obtain information required by a workflow item. An automated workflow system may assist users such as contact center staff in completing workflow items. A comprehensive workflow system may combine intelligent automation of workflow items with the performance of users for a rich user-friendly experience. An automated workflow system may empower users to complete workflow items faster in a more efficient manner.

These and other needs are addressed by the various embodiments and configurations of the present invention. The invention is directed generally to automated and partially-automated methods of workflow management as well as methods and systems for assisting human users in the performance and completion of workflow items. By utilizing a system of automating, either fully or partially, steps required by a workflow, users may be free to pursue other tasks, for example tasks requiring human input. These and other advantages will be apparent from the disclosure of the invention(s) contained herein.

The phrases "plurality," "at least one," "one or more," and "and/or" are open-ended expressions that are both conjunctive and disjunctive in operation. For example, each of the expressions "a plurality of A, B, and C," "at least one of A, B, and C," "at least one of A, B, or C," "one or more of A, B, and C," "one or more of A, B, or C" and "A, B, and/or C" means A alone, B alone, C alone, A and B together, A and C together, B and C together, or A, B, and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "data stream" refers to the flow of data from one or more, typically external, upstream sources to one or more downstream reports.

The term "dependency" or "dependent" refers to direct and indirect relationships between items. For example, item A depends on item B if one or more of the following is true: (i) A is defined in terms of B (B is a term in the expression for A); (ii) A is selected by B (B is a foreign key that chooses which A); and (iii) A is filtered by B (B is a term in a filter expression for A). The dependency is "indirect" if (i) is not true, i.e., indirect dependencies are based solely on selection (ii) and or filtering (iii).

The terms "determine," "calculate," and "compute," and variations thereof, as used herein, are used interchangeably, and include any type of methodology, process, mathematical operation, or technique.

The term "item" refers to data fields, such as those defined in reports, reporting model, views, or tables in the database.

The term "module" as used herein refers to any known or later developed hardware, software, firmware, artificial intelligence, fuzzy logic, or combination of hardware and software that is capable of performing the functionality associated with that element. Also, while the invention is described in terms of illustrative embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

Although the present disclosure is discussed with reference to workflow management systems, it is to be understood that the invention can be applied to numerous other architectures, such as any system utilizing a computer network and/or a network of less sophisticated computing devices like the Internet of Things (IoT). The present disclosure is intended to include these other architectures and network types.

Embodiments of the present disclosure may be better understood with reference to the figures. Referring first to FIG. 1, an illustrative environment 100 will be described in accordance with at least some embodiments of the present disclosure. The environment 100 of FIG. 1 may, at least in some embodiments, comprise a communication network 104 connecting one or more autonomous devices 108 (e.g., unmanned aerial vehicles (e.g., drones), computer-controlled cameras, unmanned non-aerial vehicles, etc.) to a server 116 which may comprise an image analysis system 120. While the discussion herein is primarily directed to gathering aerial imagery, it should be appreciated that any type of visible data may be obtained in similar ways. Nothing in this disclosure is intended as being limited to the collection of images using a drone.

The communication system 100 may in some embodiments include one or more remote locations 112. Each remote location 112 may be a physical place to which an autonomous device, such as a drone, may travel. In some embodiments, a remote location 112 may comprise one or more pieces of physical property such as a house. A remote location 112 may in some embodiments be an indoor location, such as a hospital room and may contain features such as furniture, computing devices, etc. In some embodiments, a remote location 112 may comprise a combination of real property, fixtures, and physical property.

In some embodiments, the system may include one or more autonomous devices 108. An autonomous device 108 may be in some embodiments a drone or another type of computer-controlled device capable of moving. In some embodiments, the autonomous device may be controlled and operated by a human operator either directly and/or indirectly. For example, a drone may be capable of carrying out provided instructions. In some embodiments, data may be collected automatically by a drone flying in an automatic pattern while recording or taking photographs automatically.

Data collected by the autonomous device(s) 108 may be in the form of still photographs or video. Images or video may be collected by a camera, for example by a drone carrying a camera or by a camera-equipped kite or other type of aerial photography mechanism. Images may be taken directly overhead or from an angle. The photos or videos may be taken by a camera capable of capturing hyper-spectral images, infrared or thermal images and/or a common camera forming an image using visible light.

In some embodiments, an autonomous device 108 may comprise one or more microphones and be capable of receiving audio. Like image data, audio data may also be sent to a server 116 or another device via the network 104. In some embodiments, audio data may be collected by an autonomous device and transmitted in real time, while in some embodiments, audio data may be collected and downloaded after some delay, for example upon the autonomous device 108 docking. In some embodiments, the server 116 may comprise an audio analysis system 140 which may be configured to analyze received audio.

In some embodiments, an autonomous device 108 may comprise one or more speakers and be capable of playing audio. For example, the autonomous device 108 may be capable of communicating with persons at the remote location. In some embodiments, the autonomous device may be configured to be used to communicate with persons at a remote location through the interchange of audio.

Data collected may be stored on a local memory device, e.g., onboard the autonomous device, or transmitted to a secondary device, e.g., a personal computer. For example, an autonomous device 108 may be equipped with onboard memory or a communication device operable to transmit the data to off-board storage. Data may be tagged upon capture or at a later point with identifying information stored as metadata or at a later point with identifying information stored as metadata or a folder name structure. Identifying information may include GPS data, a timestamp, and/or other relevant information.

Data may also be live-streamed to a collecting server via the network 104. The collecting server may automatically store the received data so that it may be easily retrieved. The data may be tagged by the collecting server with identifying information or may be tagged by the collecting device prior to transmission. Data collected or stored locally may be uploaded in bulk or in portions to a server via the network 104. The data may be uploaded via the network 104 automatically or upon command from a user operator.

Data collected by the one or more autonomous devices 108 may be sent to a server via the network 104. The data may be sent or transmitted via a wireless network e.g., an LTE or other high-speed wireless communication network or via a wireless internet, e.g., WIFI, connection, or by wired connection, e.g., Ethernet or cable.

In some embodiments, a computing device 115 such as a personal computer, a laptop, a smartphone, a server, etc. may comprise a management system 118. The management system 118 may be as described below in relation to FIG. 6 and may be in the form of a software application executing on the computing device 115. While not pictured, it should be appreciated that the computing environment in which the systems and methods described herein may comprise any number of computing devices, servers, remote locations, autonomous devices, etc.

The server may function in part as an image analysis system 120. In some embodiments, the server comprises an image analysis system 120. The image analysis system may comprise an image receiver, a feature extractor, and/or a feature analyzer. The image analysis system may be a function performed by one or more processors on the server or another device. The image analysis system may accept, as input, one or more image files. The one or more image files accepted by the image analysis system may be in the form of JPEG, IMG, PNG, bitmap, or other image file type. The image analysis system may also accept as input one or more video files. The one or more video files may be in the form of MOV, MPEG, AVI, or other format of video file type. The image and/or video files may also carry data in the form of metadata or tags. Additionally, or alternatively, the image and/or video files may be arranged in subsets of folders providing additional information. The additional information or metadata may include information such as an address, GPS coordinates, or some other location data associated with the collected image or video file, a timestamp, an operator identifier, insurance company information, and/or other information. After receiving the files, the image analysis system may use a feature extractor function to automatically determine information regarding a remote location 112 associated with the captured and received images and/or video files.

In some embodiments, the server 116 may reside in a common enterprise network (e.g., behind a common firewall). In other embodiments, the server 116 and the image analysis system 120 may be implemented by different entities and/or at different enterprise networks.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

The autonomous device(s) 108 may be configured to capture one or more images (still or motion) of a remote location 112 and provide the images to the image analysis system 120 via the communication network 104 or some other image-delivery mechanism.

The image analysis system 120 may utilize automated image processing technologies (e.g., contrast detection, contrast adjustment, color-to-greyscale conversion, grayscale-to-black-and-white conversion, pixel color or brightness analysis, adjacent pixel analysis, etc.). In some embodiments, the server 116 may further comprise an automated workflow engine 136.

An automated workflow engine 136 may be an application or a process executed by a process of a computer system such as the server 116. The automated workflow engine 136 may be configured to read data from one or more databases containing information relating to tasks assigned or assignable to one or more users. Each task may be a dataset including a description of a work item and other information such as a due date, a responsible person, etc.

Figure 2B:
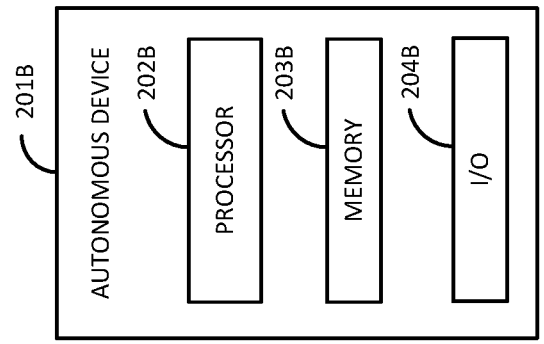
FIGS. 2A and 2B are block diagrams of computing devices in accordance with one or more of the embodiments described herein.
Figure 2A:
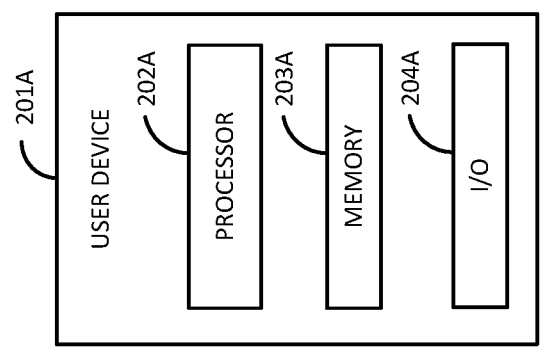

FIGS. 2A and 2B illustrate components of an exemplary computing device 201A and autonomous device 201B for use in certain embodiments as described herein. In some embodiments, a computing device 201A may comprise a processor 202A, memory 203A, and input/output devices 204A. Similarly, an autonomous device 201B may comprise a processor 202B, memory 203B, and input/output devices 204B.

A processor 202A, 202B may comprise one or more processors and/or microprocessors. As used herein, processor may refer to a plurality of processors and/or microprocessors operating together. Processors 202A, 202B may be capable of executing software and performing steps of methods as described herein. For example, a processor 202A may be configured to display user interfaces on a display of a computing device 201A. Memory 203A, 203B of a user device 201A and/or an autonomous device 201B may comprise memory, data storage, or other non-transitory storage device configured with instructions for the operation of the processor 202A, 202B to perform steps described herein. Accordingly, processes may be embodied as machine-readable and machine-executable code for execution by a processor to perform the steps herein and, optionally, other processing tasks. Input/output devices 204A, 204B may comprise, but should not be considered as limited to, keyboards, mice, microphones, speakers, cameras, display devices, network cards, etc.

Illustratively, the computing device 101A and/or autonomous devices 101B, the displays, application(s), etc. are stored-program-controlled entities, such as a computer or microprocessor, which performs the methods and the processes described herein by executing program instructions stored in a computer-readable storage medium, such as a memory (i.e., a computer memory, a hard disk, and/or the like). Although the methods described herein may be shown in a specific order, one of skill in the art would recognize that the steps of systems and methods described herein may be implemented in different orders and/or be implemented in a multi-threaded environment. Moreover, various steps may be omitted or added based on implementation.

Figure 3:
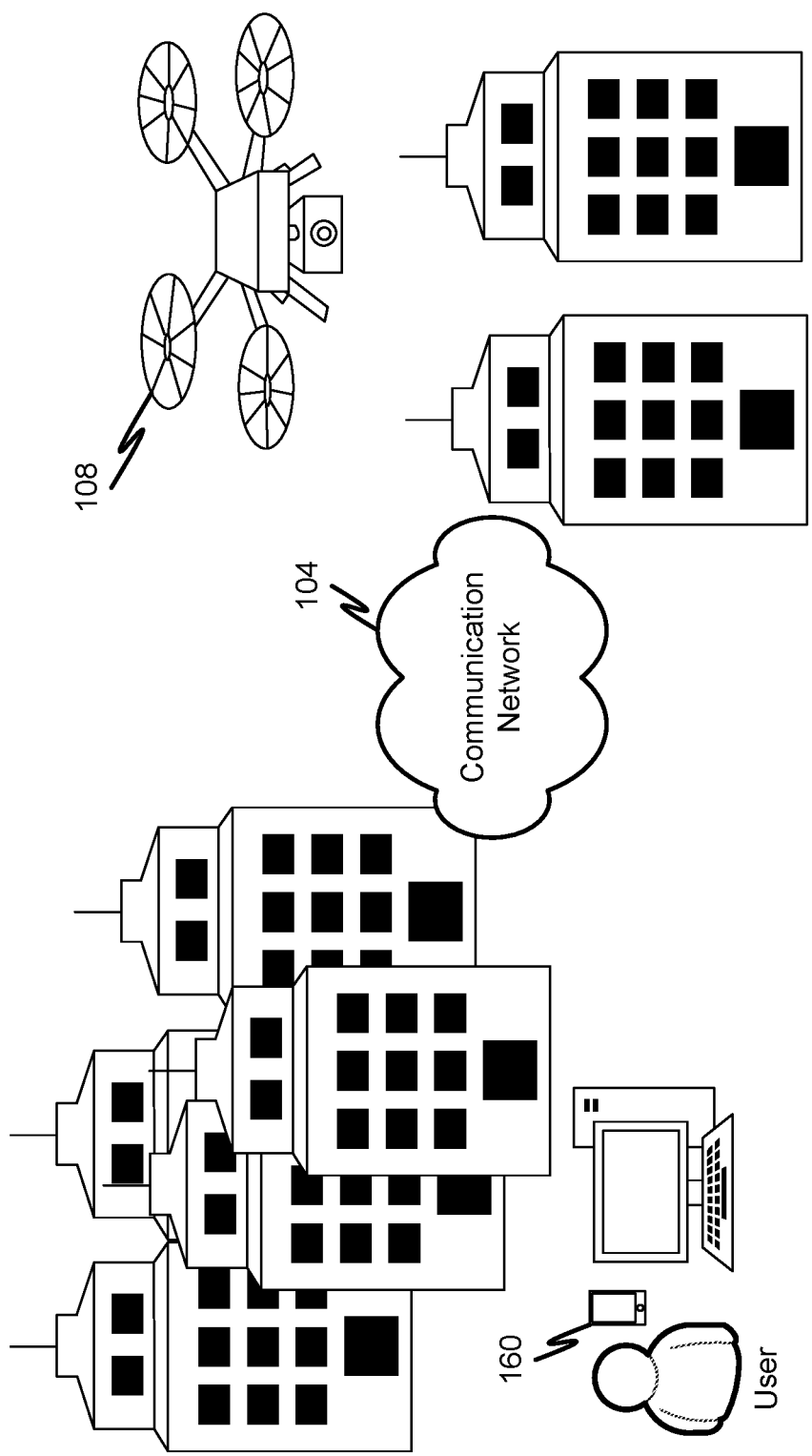
FIG. 3 is an illustration of an autonomous device in accordance with one or more of the embodiments described herein.

As illustrated in FIG. 3, an autonomous device 108 such as a drone may communicate with one or more user devices 160 via a communication network 104. The autonomous device 108 may be capable of traveling across space to arrive at a remote location. As described herein, a remote location may be an outdoor space such as a backyard of a house or an indoor space such as a room in a hospital. The autonomous device 108 may be configured to gather information using a camera, a microphone, and/or another type of sensor. The autonomous device may also be configured to transmit information using, for example, a speaker or a user interface. For example, the autonomous device may be capable of displaying a visual message and/or playing an audio message. The autonomous device may also be capable of receiving information. For example, the autonomous device may comprise a camera, a speaker, a user input device, or other type of system capable of receiving audio and/or visual information.

Utilizing systems and methods as described herein, a modernization of solutions may be provided. In some embodiments, a workflow may be executed in an automated or partially automated manner. In some embodiments, an automatic workflow surveillance platform may be provided. An automatic workflow surveillance platform may enable automatic workflow execution, data collection, and reporting.

A programmable workflow may be automated and may reduce latency associated with the human element. In some embodiments, a process such as a process comprising one or more items in a workflow may be automated. For example, a workflow may comprise an item requiring approval from a first user within four hours and, if the first user does not approve within the four hours, the item may be automatically escalated to a second user. A process in some embodiments may involve documenting something difficult to discover. For example, if a work item in a workflow needs to be assessed by a hazard assessment team, documentation for the item may include a description of the hazard assessment team, a list of users or people on the hazard assessment team, a list of items needed by the hazard assessment team to assess the item, an indication of how to contact the hazard assessment team, etc. In some embodiments a process may comprise performing an action that is a proxy for human eyes. For example, a process may comprise determining a location or a volume of a chemical spill. In some embodiments, a process may comprise remotely analyzing a situation. For example, the process may comprise determining whether a tree was planted too close to a sewage line.

As a second example, in response to a patient-monitoring system triggering an alarm, the process may comprise determining whether a patient just ripped the monitoring cables out. In some embodiments, a system as described herein may be employed in a nursing home or hospital to provide services to patients. To monitor patients, a drone may operate similarly to a human nurse. The drone can be instructed by an automated workflow system to check data in a patient's room and feed the data to an artificial intelligence system, such as one executing a convolutional neural network, along with any collected audio. The drone may be configured to interact with the patient, for example by telling the patient that the drone is going to check vitals, or to interact with other people or devices within the patient's room. For example, the drone may be configured to instruct a patient to put on vital devices. The drone may also be configured to update a workflow with data indicating the readiness of the patient. The workflow can require and combine all of the information from the vision element, audio, and patient vitals needed to continue with additional workflow steps.

An automatic workflow surveillance platform may be configured to determine whether a workflow item or a portion of a workflow item may be performed automatically and/or by an autonomous device. For example, an automatic workflow surveillance platform may be capable of determining any inputs required in response to a workflow item and determining a source for each of the determined inputs. The automatic workflow surveillance platform may be configured to identify whether any of the inputs may be provided without requiring input by a human user. Any workflow item requiring an input which may be provided without requiring input by a human user may be considered as being capable of being performed, at least in part, automatically.

Workflow items identified as being capable of being performed automatically in full or in part may be processed without input by a human user. The automatic workflow surveillance platform may be configured to process such items by determining a set of actions required to complete the item. An action may comprise, for example, instructing an autonomous device, such as a drone, to travel to a remote location and capture data such as image data.

In some embodiments, audio may be captured during or after the capturing of image data by the autonomous device. Audio may be captured from microphones onboard the autonomous device or from microphones associated with other devices. For example, in some embodiments, audio may be collected using a microphone of a computer device operated by a user. The user may record his or her voice while viewing image data captured by an autonomous device, either in real-time or at a later time.

Image and audio data may be processed using an artificial intelligence system which may be configured to analyze image and audio data to extract data relating to work items. Audio data may be processed and converted to text using a speech analysis algorithm. Once processed, captured image data can be merged with any audio element associated with the captured image data, for example audio spoken at the time of collecting the image data from the autonomous device and/or audio captured by the autonomous device.

Using a system and method as described herein, an automated inspection process may be performed. The inspection process may comprise instructing autonomous devices such as unmanned aerial vehicles, i.e., drones, performing comparisons of images captured at a same place at different points in time, determining a user who owns the process and output, generating feedback, designing projects, modifying a workflow, etc. In some embodiments, image data may be processed by an artificial intelligence system to determine whether a workflow item associated with the image data needs to be escalated to a human or whether the workflow item conforms to an expected condition. Such a system may enable automated advancement of the workflow comprising the workflow item as appropriate.

Consider an HOA board of directors as an example scenario in which an automated workflow system may improve efficiency of workflow completion. Conventionally, an HOA board may use antiquated tools, e.g., physical mail and fax, and may thus benefit from modernization. Using management software designed for HOAs, the board may be provided with an automated solution that can process architectural control requests to a committee, provide a repository for documents, send notifications after review with outcomes, etc. Such features improve workflow.

However, many work items do not lend themselves to such a straightforward workflow. For example, a workflow item may comprise the existence of modifications made in a backyard of a home. Using conventional systems, a representative is assigned to travel to the location to look for changes. The representative may be confronted by a number of challenges other than the primary challenge of travelling to the location. For example, the backyard of the home may be inaccessible or the changes to the property may be made in a non-obvious manner. Completing the work item may be time consuming and may involve contacting other people who may or may not be available, obtaining permission, etc.

It would be advantageous to have an automated workflow system. Continuing the above example, a drone stationed in the neighborhood of the property may be sent automatically by a workflow system. The drone may travel to the property, obtain image data from an aerial vantage point while performing a visual survey by taking pictures or video. The image data obtained by the drone may be compiled into one or more automated reports by the automated workflow system. The reports may include images such as still images from a video. The automated workflow system may be configured to analyze the obtained image data and compare the obtained image data with previous image data for the same location. The automated workflow system may also be configured to flag deltas which may be presented in the automated reports. The reports may be transmitted to the HOA board, a property management company, or other entities. In some embodiments, a drone may be instructed to perform periodic flyovers to visually check a neighborhood to determine compliance on a regular basis. In this way, an autonomous device can be used in place of the representative person from the management company. Leveraging the drone's abilities to automate and integrate workflow steps can provide significant savings in personnel and other resources. Information gained through such a system can be provided to a contact center or another central location.

Drones or other autonomous devices may also be deployed within buildings. For example, the systems and methods described herein may allow an off-site supervisor to use an autonomous device to monitor performance of agents. Such an embodiment may be enabled for example within a contact center to manage workflow in a meaningful way.

It should be appreciated that the automated workflow systems and methods may involve any type of autonomous devices working alone or in combination. Systems and methods may also include steps performed by humans, e.g., field tasks, observations, rendering a choice or decision at any point in the flow, etc.

Figure 4:
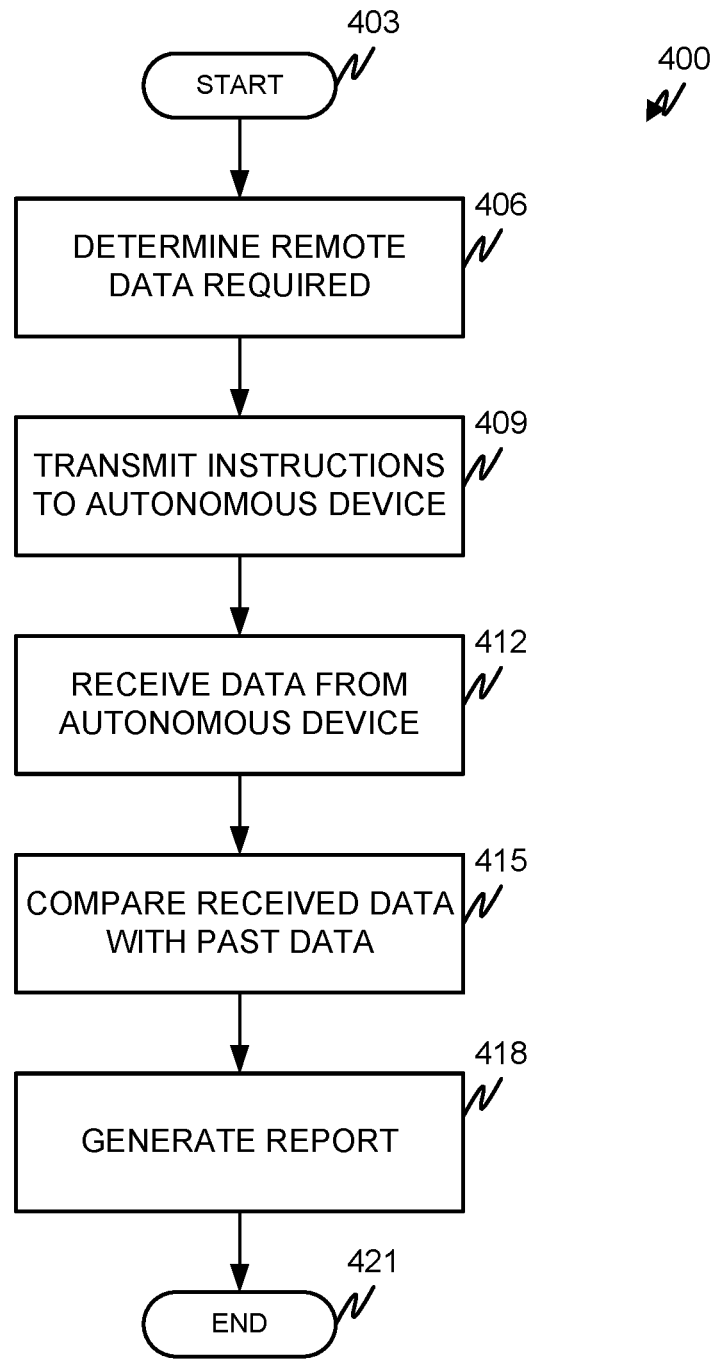
FIG. 4 is a flowchart of a method in accordance with one or more of the embodiments described herein.

As illustrated in FIG. 4, a method 400 utilizing the systems described herein may comprise a workflow management system executed by a computer device such as a server as illustrated in FIG. 1. A workflow management system may be in communication with one or more user devices, such as personal computers or smartphones, and one or more autonomous devices, such as a drone.

In some embodiments, a workflow management system may be a process or application executing on a computing device such as a server of an entity such as a contact center or other type of organization. A plurality of users may have access to aspects of the workflow management system. For example, a user such as an employee of a contact center may operate a workflow application on his or her personal computing system or user device. The user may be enabled to view aspects of one or more workflows managed by the workflow management system.

Workflows may be used by one or more users and may include workflow items. Each workflow item may be an action item instructing a user how to proceed to carry out goal steps of the workflow. New items may be added to a workflow at any time. The workflow management system may be configured to analyze workflow items and add additional workflow items when necessary.

The method 400 may start at 403. At the beginning of the method 400, a workflow may be in progress. The workflow may comprise one or more workflow items. The workflow may be assigned to one or more users. In some embodiments, the workflow may be assigned to a single user. It should be appreciated that one user may be responsible for a plurality of workflows and may work on a plurality of workflows simultaneously. As a user progresses through a workflow, the workflow management system may track the completion of each item within the workflow. The workflow management system may be configured to analyze each step or item of a workflow and determine what information is required to complete the item and whether the item may be automatically performed.

At 406, the workflow management system may determine remote data is required for a particular workflow item. In some embodiments, determining remote data is required for a particular workflow item may comprise determining one or more inputs required for completion of the item. Note that one workflow item may in some embodiments comprise a plurality of steps. If any step within a workflow item requires data from a remote location, such as a step requiring identifying whether construction on a building has commenced, the workflow management system may determine remote data is required for the workflow item.

In some embodiments, the workflow management system may also determine which autonomous device of a plurality of autonomous devices to deploy to obtain the remote data. For example, if aerial imagery is required, the workflow management system may determine an unmanned aerial vehicle should be deployed. If audio data is required, the workflow management system may determine an autonomous device comprising a microphone is required. If interaction with a human is likely to be required to be performed by the autonomous device to obtain the remote data, an autonomous device comprising interactivity features, such as a user interface display and/or a speaker and microphone, may be deployed.

At 409, the workflow management system may transmit instructions to the autonomous device. In some embodiments, the workflow management system may also generate instructions for the autonomous device to follow. For example, the workflow management system may generate and transmit directions to the location of the remote data and/or instructions regarding obtaining remote data, such as instructing the autonomous device to capture images of a particular area.

Generating instructions for an autonomous device may comprise a number of steps, such as determining a location of information needed for the workflow item, determining a type of autonomous device required to obtain the information, determining a means of communication to send the information, etc. Determining the location of the information needed for the workflow item may comprise determining a general location, e.g., an address of a property or an identity of a building, as well as a more particular location, e.g., a section of a property or a room of a building. Determining the type of autonomous device required to obtain the information may be based at least in part on the location of the information. For example, if the needed information is inside a building, a drone assigned to the building may be deployed. If the information is at a given address, the workflow management system may determine an autonomous device such as a large drone may be required to travel to the destination. Determining the type of autonomous device may comprise determining a specific autonomous device to travel to the destination. For example, the workflow management system, after determining the type of autonomous device required, may determine an availability of one or more autonomous devices capable of retrieving the necessary information and may select one of the available autonomous devices.

Transmitting instructions may comprise generating a data packet comprising the instructions and transmitting the data packet using a network connection such as a local area network connection e.g., Bluetooth or a wired connection, or a wide-area network connection such as over the Internet.

At 412, the workflow management system may receive data from the autonomous device. Receiving data from the autonomous device may comprise receiving data transmitted by the autonomous device via a network connection such as the internet.

Data received from the autonomous device may comprise image data such as still images captured by the autonomous device or video images such as a video stream captured by the autonomous device. Data received from the autonomous device may comprise audio data such as audio clips captured by the autonomous device or a stream of live audio data as received by microphones onboard the autonomous device.

Data received from the autonomous device may comprise digital data such as data files captured by the autonomous device by interacting with one or more computers at the remote location. For example, the device may travel to a location, interact with a computer, receive data, and transmit the data to the workflow management system.

Data may be received from the autonomous device in real time, for example as captured such as a live video stream, or after the autonomous device completes its trip. For example, the autonomous device may return from a trip and dock at a docking station prior to transmitting the data.

At 415, the workflow management system may compare data received from the autonomous device with past data received from the same or a similar location. Comparing data may comprise executing, with the workflow management system or with another process executing on a computing device, an image change detection algorithm. In some embodiments, comparing data received from the autonomous device may comprise first retrieving past data. For example, data gathered by one or more autonomous devices on one or more past trips to the same location may be stored in memory. Using an image change detection algorithm, the workflow management system or another system may be enabled to detect whether any visual changes have occurred between image data from a past trip and newly received image data. Similarly, other types of data may be compared using the same or similar methods. For example, data files such as excel documents or word documents obtained by an autonomous device may be reviewed for changes. Past data received from the same or a similar location may be considered as baseline data. For example, the method 400 may comprise performing an initial or baseline scan of the area. The baseline scan may be used to compare with newly received data to detect any changes between the time of the initial or baseline scan and a more recent scan of the area.

In some embodiments, comparing received data with past data may comprise comparing behavior or actions of individuals with one or more of guidelines, normal practices, and past actions or behavior. In this way, processes followed by individuals working as part of an enterprise may be observed. The workflow management system may be configured to detect any anomalies or abnormal situations occurring through the process of a user working through a workflow. If an anomaly or an abnormal situation is detected, the workflow management system may be configured to utilize one or more artificial intelligence systems to detect and document the abnormal behavior and understand what was done to correct the situation such as any remedial actions performed. The artificial intelligence system may be configured to learn from any abnormal situation so that learning can be applied to future abnormal situations. In some embodiments, guidelines or workflows may be automatically adjusted to avoid the occurrence of any anomalies or abnormal situations.

At 418, the workflow management system may generate a report presenting any detected changes in the data received or obtained by an autonomous device in a user friendly manner. In some embodiments, a report may comprise images such as stills from videos collected by the autonomous device. Newly received images may be presented side-by-side with older images from the same or similar locations. In some embodiments, a report may comprise annotated or marked-up images. Annotations or markings may be generated automatically by a workflow management system. For example, the workflow management system may be configured to identify changes between new and old images of a common location and to visually indicate the locations of the changes.

In some embodiments, reports may comprise one or more video files embedded within the report. The videos may be viewable by readers of the report. For example, a report may be configured to be interactable by users and videos and audio may play upon command.

In some embodiments, a report may comprise one or more written descriptions. Written descriptions may in some embodiments be automatically generated by the workflow management system. For example, the workflow management system may automatically add a description of the location associated with the images comprised in the report, a timestamp indicating a date and time the information in the report was gathered, etc. In some embodiments, the report may comprise written material which may be editable and addable by users.

Reports may also comprise embedded audio to which users may listen. Written material within a report may comprise transcriptions of speech detected within audio collected by an autonomous device. For example, audio collected by an autonomous device may be processed by the workflow management system or another system. The audio may be processed using a speech recognition algorithm.

After the report is generated, the report may be made available automatically to one or more users. The report may be stored along with other information relating to a workflow. For example, users may view a workflow by accessing the workflow management system. A workflow may include a link to a webpage or data location storing a report associated with the workflow.

In some embodiments, users assigned to a particular workflow may receive notifications when a new report associated with the workflow is generated. In some embodiments, generating a report may comprise updating an existing report to include new information associated with information in the existing report. In such embodiments, users with access to the existing report or assigned to a workflow associated with the existing report may receive a notification indicating a change has been made to the existing report. At 421, the method may end.

In some embodiments, a system may comprise using a drone to observe humans performing functions. In such a system, the drone may be instructed to ask the humans questions, e.g., "What are you doing?". Such a system may be capable of automatically capturing subsections of a workflow that can later be put into a master workflow.

In some embodiments, a system may be configured to generate work items capable of being resolved without human interaction. For example, a workflow management system may be configured to determine that a permit fee should be paid. The system may automatically transmit payment instructions to the entity responsible for paying the fee and allow the entity to pay a fee by creating a contact within a customer service center (CSC) and providing payment instructions. The system may also create outbound work for the CSC, for example, instructions to send notifications of fee due, outbound contact attempts to collect fees, outbound dispatches to fee collection agencies, etc.

In some embodiments, a system may comprise instructing an autonomous device to observe operations and create a workflow based on observations. For example, an autonomous device may be instructed to follow a human and record image data. A workflow management system may be configured to analyze the image data to determine steps being performed by the human. If the workflow management system determines any steps have been performed by the human, the workflow management system may be configured to create a workflow or update an existing workflow by adding items reflecting the steps determined to have been performed by the observed human.

Similarly, a system may comprise using an autonomous device to establish a normal baseline or pattern relating to a workflow. While many methods and processes may be performed in a variety of ways, through observation similarities may be observed. One or more autonomous devices may be configured or instructed to observe one or more humans performing tasks which may not be part of any known workflow. The autonomous devices may capture audio and/or image data while observing the one or more humans. The audio and/or image data may be processed to detect distinct tasks. A workflow management system may be enabled to determine any distinct tasks and, over time, detect patterns in behavior. If the humans end goal is known or is detected to be a common goal, the steps performed to achieve that goal may be processed and any common or similar tasks may be identified as being a baseline set of actions for completing the goal.

In some embodiments, a system may comprise using an autonomous device to capture what a workflow needs to have happen. For example, an autonomous device may be configured to or instructed to observe users performing tasks during a workflow. The autonomous device may be capable of, while observing, detecting any needed action or information. Such information may indicate the workflow being performed by the observed user is incomplete and should be updated. A workflow management system may be configured to process image and/or audio data obtained by an autonomous device and update workflows when necessary.

In some embodiments, a system may comprise using an autonomous device to aid in a workflow for security drift and hardening. For example, an autonomous device may periodically perform a scan of a physical location or a digital location such as a data source to see whether anything has changed. Using an autonomous device in such a fashion avoids the necessity of users manually checking data for changes. Any change in data or physical changes in a location may be observed and reflected in image data or audio data gathered by an autonomous device. A workflow management system may be configured to process data gathered by an autonomous device and adjust security rules based on changes when necessary.

In some embodiments, a system may comprise addressing delays, receiving transmissions, processing instructions, and assessing capabilities of autonomous devices relative to workflow. For example, a workflow management system may be configured to monitor the status of one or more autonomous devices. If an undue delay in the completion of a workflow item is detected, the workflow management system may recall an autonomous device and deploy a second autonomous device to complete the item. Similarly, if an autonomous device is determined to lack requisite capabilities, the workflow management system may recall the device and deploy a second autonomous device to complete the item requiring the capabilities.

In some embodiments, a workflow management system may be configured to determine a device type required for completion of a workflow item. For example, if aerial imagery is required, a workflow management system may determine a drone or other type of unmanned aerial vehicle should be deployed. Similarly, if audio is required, an autonomous device comprising a microphone may be deployed.

Workflows may also be viewable by a user regardless of whether the user is responsible for any workflow items within the workflow. For example, even when a workflow does not explicitly engage a user, items in the workflow can be made to be inspectable and/or visible to the user. When the user is responsible for answering an inquiry not explicitly involving any particular workflow, the user may be enabled to initiate a query regarding active workflows to discover whether any particular workflow involves or is affected by the inquiry. The user may then check the state and/or stage of any workflow. Such a system may better enable users such as customer service representatives to help other users such as customers.

Figure 5:
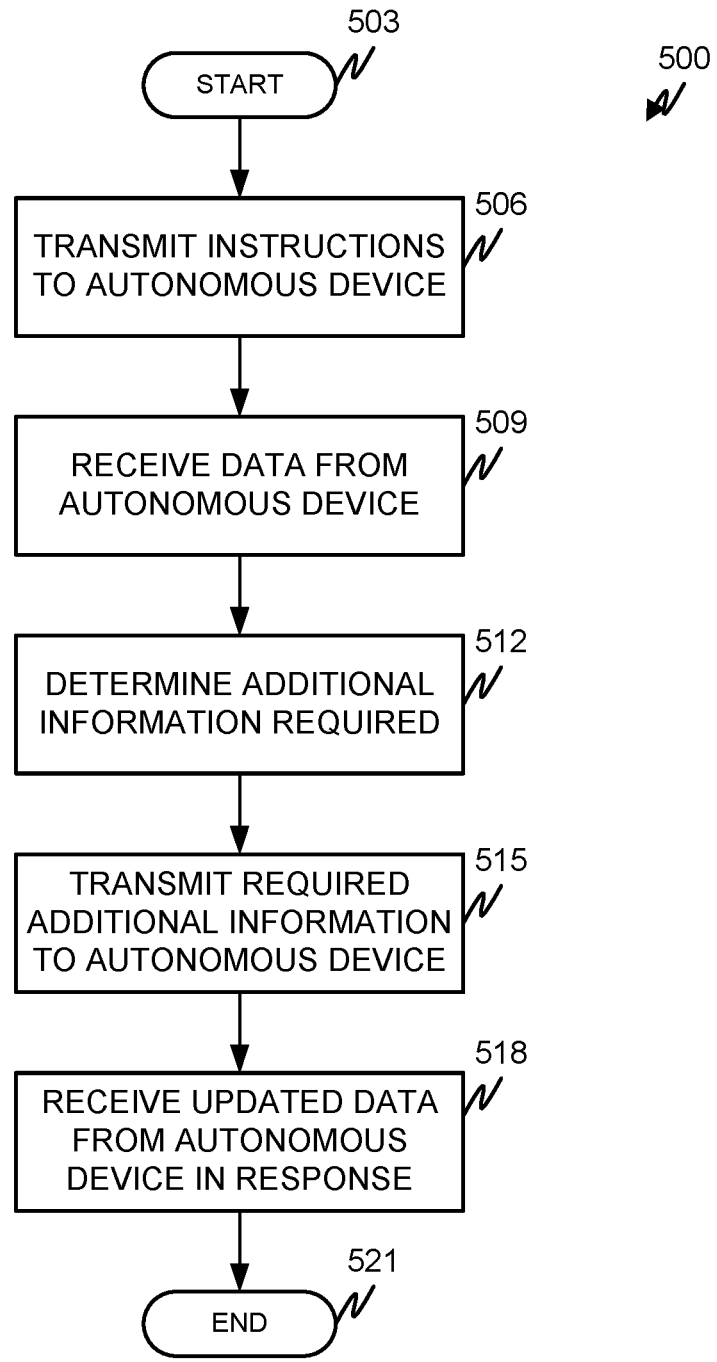
FIG. 5 is a flowchart of a method in accordance with one or more of the embodiments described herein.

As illustrated in FIG. 5, a method 500 utilizing the systems described herein may comprise a workflow management system executed by a computer device such as a server as illustrated in FIG. 1. A workflow management system may be in communication with one or more user devices, such as personal computers or smartphones, and one or more autonomous devices, such as a drone.

The method 500 may start at 503. At the beginning of the method 500, a workflow may be in progress. The workflow may comprise one or more workflow items. The workflow may be assigned to one or more users. In some embodiments, the workflow may be assigned to a single user. It should be appreciated that one user may be responsible for a plurality of workflows and may work on a plurality of workflows simultaneously. As a user progresses through a workflow, the workflow management system may track the completion of each item within the workflow. The workflow management system may be configured to analyze each step or item of a workflow and determine what information is required to complete the item and whether the item may be automatically performed.

At 506, the workflow management system may transmit instructions to the autonomous device. As described above, in some embodiments, the workflow management system may generate instructions for the autonomous device to follow. For example, the workflow management system may generate and transmit directions to the location of the remote data and/or instructions regarding obtaining remote data, such as instructing the autonomous device to capture images of a particular area.

As described above, generating instructions for an autonomous device may comprise a number of steps, such as determining a location of information needed for the workflow item, determining a type of autonomous device required to obtain the information, determining a means of communication to send the information, etc.

Transmitting instructions, as described above, may comprise generating a data packet comprising the instructions and transmitting the data packet using a network connection such as a local area network connection e.g., Bluetooth or a wired connection, or a wide-area network connection such as over the Internet.

At 509, the workflow management system may receive data from the autonomous device. As discussed above, receiving data from the autonomous device may comprise receiving data transmitted by the autonomous device via a network connection such as the internet.

As described above, data received from the autonomous device may comprise image data such as still images captured by the autonomous device or video images such as a video stream captured by the autonomous device. Data received from the autonomous device may comprise audio data such as audio clips captured by the autonomous device or a stream of live audio data as received by microphones onboard the autonomous device.

As described above, data received from the autonomous device may comprise digital data such as data files captured by the autonomous device by interacting with one or more computers at the remote location. For example, the device may travel to a location, interact with a computer, receive data, and transmit the data to the workflow management system.

Data may be received from the autonomous device in real time, for example as captured such as a live video stream, or after the autonomous device completes its trip. For example, the autonomous device may return from a trip and dock at a docking station prior to transmitting the data.

In some embodiments, data received from an autonomous device may comprise a request for data. For example, the autonomous device may be configured to be capable of determining the requested information is unavailable, inaccessible, or otherwise not capable of being acquired. In some embodiments, the data may be held by an individual or a computing device. In such embodiments, the autonomous device may be required to interact with the individual or computing device to determine additional information. In some embodiments, one or more unexpected variables may be in existence, requiring the autonomous device to receive assistance.

At 512, the workflow management system may determine additional information is required by the autonomous device. In some embodiments, receipt of a request for more information may automatically trigger a determination that additional information is required. In some embodiments, the workflow management system may be configured to actively monitor data received from an autonomous device and based on the received data, determine whether the autonomous device requires information to continue its pursuit of the data required for the workflow item. In some embodiments, a user may actively monitor data received from the autonomous device and manually determine if and when more information is required by the autonomous device.

The workflow management system may be configured to automatically generate the required additional information. In some embodiments, the required additional information may be input by a user. For example, the workflow management system may generate a transcript or audio recording to be played by the autonomous device in order to communicate with one or more individuals. In some embodiments, an autonomous device may be configured to execute a text-to-speech algorithm to play an audio version of text. In some embodiments, an autonomous device may be configured to display text on a user interface. In this way, an autonomous device may be enabled to communicate with individuals at a remote location to obtain the information required by the workflow item.

At 515, the workflow management system may transmit the required additional information to the autonomous device. As discussed above, the workflow management system may be capable of transferring data wirelessly to an autonomous device. In some embodiments, a cellular connection may be used. The generated required additional information may be transferred to the autonomous device in the form of a data packet. The generated required additional information may comprise instructions for the autonomous device to interact with computer systems and/or individuals at the remote location.

At 518, the workflow management system may receive updated data from the autonomous device in response to the additional information. For example, if the autonomous device interacts with an individual or a computer system at the remote location, any data received from the individual or computer system, such as audio or text input, may be transmitted to the workflow managed system. At 521, the method 500 may end.

While the examples discussed above relate to a drone or other type of autonomous device traveling to a remote location to obtain information, the systems and methods described in the present disclosure should not be considered as being so limited. In some embodiments, a workflow management system may comprise software monitors a snapshot of a situation involving a computer system. For example, a management system may be configured to monitor open ports, open or available connections, configuration parameters, file statuses, etc. for one or more computer systems. In some embodiments, the management system may execute a scan of a computer system on a periodic basis, such as every hour, continuously scan the computer system, execute a scan on demand by a user, execute a scan in response to detection of a particular event, or scan the computer system at any other time. In some embodiments, the management system may be a process executing on the computer system being scanned, while in some embodiments, the management system may scan other computer systems in communication with a computer system executing the management system.

For example, consider a hacker who has shut down an antivirus program, stopped a logging process, disabled a firewall or encryption, etc. Such events can cause a great deal of damage to a computer system. A management system as described herein may be configured to detect such an event upon a scan being performed, for example within every fifteen minutes or every hour. After scanning the computer system, the management system may be configured to discover such an event occurred, determine the event is a significant event requiring attention, log information relating to the event, and return the computer system back to a previously known baseline. In some embodiments, an artificial intelligence system or a human user may be enabled to intervene in the process of determining one or more of whether the event is significant and how to respond to the event.

Described herein, methods and systems of surveillance and file integrity management may be executed by a computer system providing an advantage over conventional systems. Today's systems that exist for file integrity management produce a great deal of noise and as a result fail to provide useful information in a user friendly manner. Using a system as described herein, leveraging artificial intelligence and automated processes, a file integrity management system may be enabled to adequately edit the noise of common computer processes while providing automated actions and a report in response to detection of a significant event. Using a system and method as described herein, false positive events can be ignored, and meaningful events can be flagged.

As a result of the systems and methods described herein, the noise associated with conventional methods of file integrity relating to the overwhelming list of changes that occur within a system at any given time can be reduced. The systems and methods described herein provide a detection and reporting system enabling users to view a meaningful list of changes and an automated workflow for responding to significant events.

Figure 6:
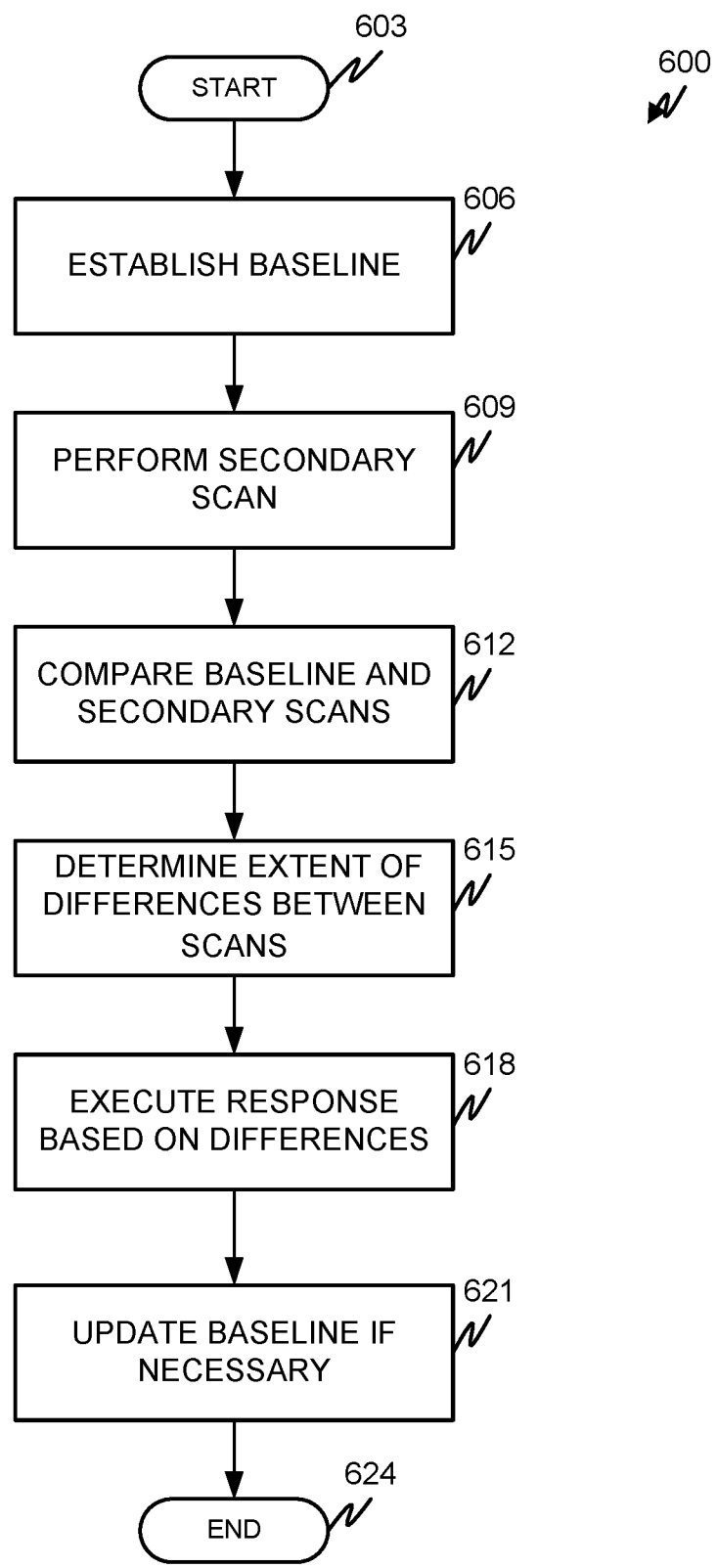
FIG. 6 is a flowchart of a method in accordance with one or more of the embodiments described herein.

As illustrated in FIG. 6, a method 600 of monitoring or surveilling a computer system in accordance with one or more of the embodiments described herein may comprise a management system executing on a computer system. The computer system may be connected to one or more other computer systems for example by a network connection. The computer system may store one or more computer files in memory. At 603, the method 600 may begin with the management system being initiated. In some embodiments, the management system may be initiated by a user on demand. In some embodiments, the management system may automatically execute upon startup of the computer system.

A management system as described herein may be installed on a machine to be surveilled or may monitor a number of devices across a network. Such a method may in some embodiments be initiated remotely, for example using a second computer system across a cloud-based network connection. In some embodiments, a method or system as described herein may be initiated by a user of the computer system to be scanned. In some embodiments, a management system may be configured to scan files, ports, connections, etc., across a network and thus may not be limited to any one particular computing environment. In this way, regardless of whether files are stored in remote file storage solutions or on a local drive, the management system may be configured to provide surveillance of any files, ports, connections, etc., which may affect the computer system or multiple computer systems.

As described herein, using a process of observation, workflows may be created and/or modified in response to detection of a significant event or other type of event requiring an action in response. The process described herein may involve establishing a normal baseline or pattern, detecting a deviation from the baseline, determining a response comprising creating, modifying, or executing a workflow or action, and/or generating a report describing any detected significant deviation from the established baseline. In this way, an electronic system may be configured to detect system changes, OS changes, configuration file changes, open ports, etc., and perform an action in response.

While the above embodiments describe detecting changes using an autonomous device, it should be appreciated the same or similar processes may be used using a computer process running and monitoring any changes in a file system, creating a list of files that have changed, and flagging changes. The management system may be configured to determine a proper response. For example, if a known workflow is a proper action in response to a detected event or change, the management system may initiate the known workflow, if the change is something new to which the management system does not know how to respond, the management system may raise an alarm and create a new workflow.

In some embodiments, a management system may be configured to perform a baseline or initial scan of a computer system. At 606, the management may perform the baseline scan of the computer system. For example, the management system may analyze contents and/or statuses of any files stored in memory or on a hard drive associated with the computer system, may check for any open ports, analyze configuration parameters, available or open connections, etc. The results of the baseline scan may be stored in memory. In some embodiments, the baseline scan may be performed automatically when the management system is initiated. In some embodiments, the baseline scan may be performed based on user input.

At 609, after an initial or baseline scan, the management system may perform a secondary scan. For example, a month or a week or another period of time after the baseline scan, the management system may electronically scan the computer system to again analyze contents and/or statuses of any files stored in memory or on a hard drive associated with the computer system, check for any open ports, analyze configuration parameters, available or open connections, etc. The results of the secondary scan may be stored in memory.

In some embodiments, the secondary scan may be performed periodically, for example, a bi-weekly scan may be scheduled. In some embodiments, a secondary scan may be performed continuously in real-time or may be performed upon user demand. In some embodiments, a secondary scan may be performed automatically in response to detection of a triggering event. For example, a secondary scan may be performed upon detection of a new port being opened.

At 612, the management system may compare secondary scan with baseline scan and determine if any differences exist. For example, the management system may be configured to look for any differences between a secondary scan and a baseline scan and flag any detected difference.

At 615, the management system may determine whether any detected differences between the secondary scan and the baseline are significant changes or are associated with significant events and determine next steps in response to the differences. For example, the management system may be configured to generate a flag indicating that a file is damaged, changed, or reconfigured, or that some content was added to code, etc. In this way, the management system may be configured to detect that something abnormal, unusual, unexpected, anomalous, etc., has occurred.

In some embodiments, an artificial intelligence engine may be created and used in relation to the management system. A training database may be used to train the artificial intelligence engine to determine whether a change is a significant event. In some embodiments, the management system may look at configuration settings, run a hash on each file in memory, and identify differences. The management system may run a hash on certain sections of a file, recognize that some fields within a file are relating to usernames, passwords, etc., depending on configuration settings. The management system or an artificial intelligence engine may be configured to analyze at each element or structure of a file and determine whether the element or structure refers to a port, a name, a connection, etc.

In some embodiments, the management system may be configured to analyze new connections to the computer system and determine whether the creation of the new connections amount to a significant change. For example, the management system may detect a new connection has been created, determine the connection leads to an endpoint that is on a blacklist, or is outside a whitelist, and based on the determination that the endpoint is on a blacklist or is outside a whitelist, determine that an automatic response should be performed. In some embodiments, an automatic response may be notifying a user suggestion an intervention be performed. In this way, the management system may be enabled to look at details of structured data, utilize an artificial intelligence engine to learn from the changes in the structured data inside of the computer system and make intelligent decisions about potential dispositions in response to any detected changes.

In some embodiments, a management system may be configured to detect a port change has occurred, determine the port change is not a normal situation, and in response check whether a workflow exists for the detected port change. For example, if there were ports on the system that were legitimately established in a baseline scan, and when a secondary scan occurs the management system sees that a new port has opened, a determination can be made as to why the port is open. The newly opened port can be compared to the ports of the baseline scan, and the management system can flag the newly opened port if it is different. A human may be notified, or an automated determination may be made as to whether to approve the new port or deny the new port and shut the new port down.

In some embodiments, an artificial intelligence engine may be enabled to learn by looking into a set of rules to determine whether a workflow exists for a particular type of situation. If the artificial intelligence engine determines no workflow exists, the management system may be configured to create a new workflow. A new workflow may consist, for example, of a number of actions which may be performed in response to the detected event. Users may be assigned to a workflow and may be enabled to view steps of the workflow and may be enabled to edit or configure the steps involved in the workflow. In some embodiments, one or more steps of a workflow may be performed automatically without requiring human action. Steps of a workflow in response to a detected port change may comprise blocking the port, allowing the port, setting off an alarm, deleting references to the port, notifying a human, etc. In some embodiments, an entire workflow could comprise automated steps which may be performed automatically, instantaneously, or delayed.

As another example, if a user is detected as having standard user privileges in a baseline scan, and a secondary scan detects the user's privileges were elevated, the management system may determine an unusual situation has occurred. For example, improperly elevated user privileges could be equated to a heightened security risk, while properly elevated user privileges could be a normal situation. The management system may be enabled to flag such an event as a delta between the prior configuration and the new configuration. A workflow may be established, for example notifying an administrator of the changes in the user's privileges and requesting approval or denial of the changes. In some embodiments, a workflow may also comprise automatically returning the user's privileges to the standard level until approved by an administrator.

As another example, after a secondary scan, the management system may detect that an authorization file containing usernames and passwords has been changed to add a new user and a new password. As a result, the management system may flag the delta in the authorization file as an unusual event. A workflow may be initiated comprising steps instructing a user to review the changed data and approve or deny the change.

In some embodiments, creating a workflow may be to creating a program or a process with a sequence of executable commands. For example, a new workflow may comprise instructions as to what actions should be performed. Actions may be, for example, print screen, write email, generate a log entry, block a port or user, unblock a port or user, etc. For example, if a user deactivated an antivirus program, a workflow may comprise automatically reenacting the antivirus program. As another example, if a user deactivated a firewall, a workflow may comprise automatically reenacting the firewall. Each step may in some embodiments be approved or performed upon command by a human or by another process.

At 618, the method 600 may comprise executing a response to differences. In some embodiments, in addition to or instead of initiating a workflow or creating a new workflow, a report may be generated. For example, an artificial intelligence engine may be configured to examine a delta of a file following a secondary scan and determine whether a new workflow should be created. If a new workflow is created, executing a response to the difference in the file may comprise performing a first step of the workflow or assigning the workflow to one or more users. For example, if the change in the file relates to an authorization for the file, e.g., someone added a new authorized user for the file, the artificial intelligence engine may be used to flag that the new authorized user has been added. Since a new authorized user has been added, the event may be entered into a log and the management system may send an email, SMS message, or other type of notification to one or more users. The log created in response to the detected new authorized user may include a statement indicating which fields in the file have been changed. For example, the log may indicate that a new user has been authorized, which user modified the file by adding the new authorized user, and at what time and/or date the change occurred. Each detected change that is determined to be significant may be reflected in a log. For each scan, each log may be compiled into a report which may be viewable by one or more users.

In some embodiments, a reports may comprise names of files or structures detected as having changed between a baseline and a secondary scan. In some embodiments, reports may be generated in such a way as to avoid revealing sensitive information. For example, in some embodiments an artificial intelligence system may be used to obfuscate items determined to be private. The artificial intelligence engine may be trained to recognize and obfuscate secure information. For example, a report may comprise a statement that "A username beginning with ABA has configured privileges escalations at 12:15 AM on Oct. 5, 2021", or "A port was opened at 4:30 PM on Oct. 5, 2021." As should be appreciated, reports may be produced in a human-readable format and without revealing sensitive information such as social security numbers, phone numbers, etc. In some embodiments, phone numbers may be censored using character replacement, for example a report may include that a phone number ends with particular digits, e.g., ###-###-4567. Such a report may provide a user a hint of what to look for where something happened that is unusual.

At 621, the management system may update the baseline if necessary. For example, if a new port has been added and approved, the management system may respond by adding the new port to the baseline. For any future secondary scans, the new port can be considered as part of the baseline and as such would not be considered as a new port following the future secondary scans. At 624, the method 600 may end.

Any and all data received from the autonomous device by the workflow management system, or the management system described in relation to FIG. 6 may be built into a report as described above. After the report is generated, the report may be made available automatically to one or more users. The report may be stored along with other information relating to a workflow. For example, users may view a workflow by accessing the workflow management system. A workflow may include a link to a webpage or data location storing a report associated with the workflow.

As described above, in some embodiments, users assigned to a particular workflow may receive notifications when a new report associated with the workflow is generated. In some embodiments, generating a report may comprise updating an existing report to include new information associated with information in the existing report. In such embodiments, users with access to the existing report or assigned to a workflow associated with the existing report may receive a notification indicating a change has been made to the existing report.

Embodiments of the present disclosure include a method for surveilling, the method comprising: generating, with a processor, a baseline associated with a subject; performing, with the processor, a scan of the subject; comparing, with the processor, the scan of the subject with the baseline; and generating, with the processor, a report comprising a result of the comparing of the scan of the subject with the baseline associated with the subject.

Aspects of the above method include wherein the subject is a remote physical location.

Aspects of the above method include wherein performing the scan of the subject comprises instructing an autonomous device to travel to the remote subject.

Aspects of the above method include wherein: generating the baseline associated with the subject comprises receiving first image data from the autonomous device, performing the scan of the subject comprises receiving second image data from the autonomous device, and the report further comprises a comparison of the first image data with the second image data.

Aspects of the above method include wherein the subject is a computing system and generating the baseline comprises detecting one or more open ports associated with the subject.

Aspects of the above method include wherein performing the scan comprises detecting one or more new open ports associated with the subject.

Aspects of the above method include the method further comprising, after generating the report, creating a workflow based on the detected one or more new open ports associated with the subject.

Aspects of the above method include the method further comprising receiving, with the processor, audio data from an autonomous device and analyzing, with the processor, the audio data with an artificial intelligence system.

Aspects of the above method include wherein the report comprises an analysis of the audio data output by the second artificial intelligence system.

Embodiments include a computer system comprising: a processor; and a computer-readable storage medium storing computer-readable instructions which, when executed by the processor, cause the processor to execute a method, the method comprising: generating a baseline associated with a subject; performing a scan of the subject; comparing the scan of the subject with the baseline; and generating a report comprising a result of the comparing of the scan of the subject with the baseline associated with the subject.

Aspects of the above computer system include wherein the subject is a remote physical location.

Aspects of the above computer system include wherein performing the scan of the subject comprises instructing an autonomous device to travel to the remote subject.

Aspects of the above computer system include wherein: generating the baseline associated with the subject comprises receiving first image data from the autonomous device, performing the scan of the subject comprises receiving second image data from the autonomous device, and the report further comprises a comparison of the first image data with the second image data.

Aspects of the above computer system include wherein the subject is a computing system and generating the baseline comprises detecting one or more open ports associated with the subject.

Aspects of the above computer system include wherein performing the scan comprises detecting one or more new open ports associated with the subject.

Aspects of the above computer system include the method further comprising, after generating the report, creating a workflow based on the detected one or more new open ports associated with the subject.

Aspects of the above computer system include the method further comprising receiving, with the processor, audio data from an autonomous device and analyzing, with the processor, the audio data with an artificial intelligence system.

Aspects of the above computer system include wherein the report comprises an analysis of the audio data output by the second artificial intelligence system.

A computer program product comprising: a non-transitory computer-readable storage medium having computer-readable program code embodied therewith, the computer-readable program code configured, when executed by a processor, to execute a method, the method comprising: generating a baseline associated with a subject; performing a scan of the subject; comparing the scan of the subject with the baseline;

and generating a report comprising a result of the comparing of the scan of the subject with the baseline associated with the subject.

Aspects of the above computer program product include wherein the subject is a remote physical location.

Aspects of the above computer program product include wherein performing the scan of the subject comprises instructing an autonomous device to travel to the remote subject.

Aspects of the above computer program product include wherein: generating the baseline associated with the subject comprises receiving first image data from the autonomous device, performing the scan of the subject comprises receiving second image data from the autonomous device, and the report further comprises a comparison of the first image data with the second image data.

Aspects of the above computer program product include wherein the subject is a computing system and generating the baseline comprises detecting one or more open ports associated with the subject.

Aspects of the above computer program product include wherein performing the scan comprises detecting one or more new open ports associated with the subject.

Aspects of the above computer program product include the method further comprising, after generating the report, creating a workflow based on the detected one or more new open ports associated with the subject.

Aspects of the above computer program product include the method further comprising receiving, with the processor, audio data from an autonomous device and analyzing, with the processor, the audio data with an artificial intelligence system.

Aspects of the above computer program product include wherein the report comprises an analysis of the audio data output by the second artificial intelligence system.

The illustrative systems and methods of this invention have been described in relation to a workflow management system. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the illustrative embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In some embodiments, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Illustrative hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method for surveilling, the method comprising:
   generating, with a processor, a baseline associated with a remote physical location;
   performing, with the processor, a scan of the remote physical location;
   comparing, with the processor, the scan of the remote physical location with the baseline; and
   generating, with the processor, a report comprising a result of the comparing of the scan of the remote physical location with the baseline associated with the remote physical location.

2. The method of claim 1, wherein performing the scan of the remote physical location subject comprises instructing an autonomous device to travel to the remote physical location.

3. The method of claim 2, wherein:
   generating the baseline associated with the remote physical location comprises receiving first image data from the autonomous device,
   performing the scan of the remote physical location comprises receiving second image data from the autonomous device, and
   the report further comprises a comparison of the first image data with the second image data.

4. The method of claim 1, further comprising receiving, with the processor, audio data from an autonomous device and analyzing, with the processor, the audio data with an artificial intelligence system.

5. The method of claim 4, wherein the report comprises an analysis of the audio data output by the artificial intelligence system.

6. A computer system comprising:
   a processor; and
   a computer-readable storage medium storing computer-readable instructions which, when executed by the processor, cause the processor to execute a method, the method comprising:
      generating a baseline associated with a remote physical location;
      performing a scan of the remote physical location;
      comparing the scan of the remote physical location with the baseline; and
      generating a report comprising a result of the comparing of the scan of the remote physical location with the baseline associated with the remote physical location.

7. The computer system of claim 6, wherein performing the scan of the remote physical location comprises instructing an autonomous device to travel to the remote physical location.

8. The computer system of claim 7, wherein:
   generating the baseline associated with the remote physical location comprises receiving first image data from the autonomous device,
   performing the scan of the remote physical location comprises receiving second image data from the autonomous device, and
   the report further comprises a comparison of the first image data with the second image data.

9. The computer system of claim 6, wherein the method further comprises receiving audio data from an autonomous device and analyzing the audio data with an artificial intelligence system.

10. The computer system of claim 9, wherein the report comprises an analysis of the audio data output by the artificial intelligence system.

11. A computer program product comprising:
    a non-transitory computer-readable storage medium having computer-readable program code embodied therewith, the computer-readable program code configured, when executed by a processor, to execute a method, the method comprising:
generating a baseline associated with a remote physical location;
performing a scan of the remote physical location;
comparing the scan of the remote physical location with the baseline; and
generating a report comprising a result of the comparing of the scan of the remote physical location with the baseline associated with the remote physical location.

12. The computer program product of claim 11, wherein performing the scan of the remote physical location comprises instructing an autonomous device to travel to the remote physical location.

13. The computer program product of claim 12, wherein:
generating the baseline associated with the remote physical location comprises receiving first image data from the autonomous device,
performing the scan of the remote physical location comprises receiving second image data from the autonomous device, and
the report further comprises a comparison of the first image data with the second image data.

14. The computer program product of claim 11, wherein the method further comprises receiving, with the processor, audio data from an autonomous device and analyzing, with the processor, the audio data with an artificial intelligence system.

15. The computer program product of claim 14, wherein the report comprises an analysis of the audio data output by the artificial intelligence system.

16. The computer program product of claim 11, wherein the scan comprises one or more of audio and image data.

17. The computer program product of claim 11, wherein the report comprises image data.

18. The method of claim 1, wherein the scan comprises one or more of audio and image data.

19. The method of claim 1, wherein the report comprises image data.

20. The computer system of claim 6, wherein the scan comprises one or more of audio and image data.

* * * * *

UNITED STATES PATENT AND TRADEMARK OFFICE
CERTIFICATE OF CORRECTION

PATENT NO. : 11,627,288 B2
APPLICATION NO. : 17/218763
DATED : April 11, 2023
INVENTOR(S) : David Chavez et al.

It is certified that error appears in the above-identified patent and that said Letters Patent is hereby corrected as shown below:

In the Claims

Column 26, Line 10, Claim 10 delete "subject" therein.

Signed and Sealed this
Twelfth Day of September, 2023

Katherine Kelly Vidal
*Director of the United States Patent and Trademark Office*